United States Patent [19]

Adeboi et al.

[11] 4,382,861

[45] May 10, 1983

[54] LIQUID FILTER

[75] Inventors: Frans L. Adeboi, Berea; James G. Freeman, Euclid, both of Ohio

[73] Assignee: The Meyer Dairy Products Company, Cleveland, Ohio

[21] Appl. No.: 234,324

[22] Filed: Feb. 13, 1981

[51] Int. Cl.³ .............................................. B01D 29/14
[52] U.S. Cl. .............................. 210/497.2; 210/497.3
[58] Field of Search ............... 210/455, 473, 474, 477, 210/497.2, 497.3

[56] References Cited

U.S. PATENT DOCUMENTS 3,444,791 5/1969 Honsel ............................ 210/477 X

FOREIGN PATENT DOCUMENTS 682602 6/1966 Belgium ........................... 210/497.2
2854226 1/1980 Fed. Rep. of Germany ... 210/497.2
2028675 3/1980 United Kingdom ............. 210/497.2

Primary Examiner—Thomas G. Wyse
Attorney, Agent, or Firm—Fay & Sharpe

[57] ABSTRACT

A permanent, reuseable liquid filter comprised of a thin flexible filter material and a support skeleton secured thereto. The filter is adapted to assume a filtering condition generally coextensive with the internal conformation of a generally oblong somewhat conical cup-shaped filter support at least when the filter is inserted thereinto. The filter may normally be in a generally flat condition for subsequent folding into the cup-shaped conformation upon insertion into the filter support or may be fabricated and assembled so as to normally assume a somewhat cup-shaped conformation. In both filter types, the support skeleton is typically located on the outside surface of the filter material and includes a plurality of support ribs extending from a bamd-like filter bottom area toward the filter open or top end. Selected ones of the support ribs are located in a manner such that when the filter construction is either folded for use or initially assembled, they will be positioned at generally opposed end areas of the filter which will communicate with end areas of the filter support. Additional support ribs at spaced intervals intermediate these ends and a base support member at the band-like filter bottom area may be advantageously provided. In the assembled type of filter construction, discardable retaining arms may be included with the skeleton to temporarily maintain the filter in an assembled condition to accommodate subsequent interconnection of selected ones of the support ribs to each other.

24 Claims, 8 Drawing Figures

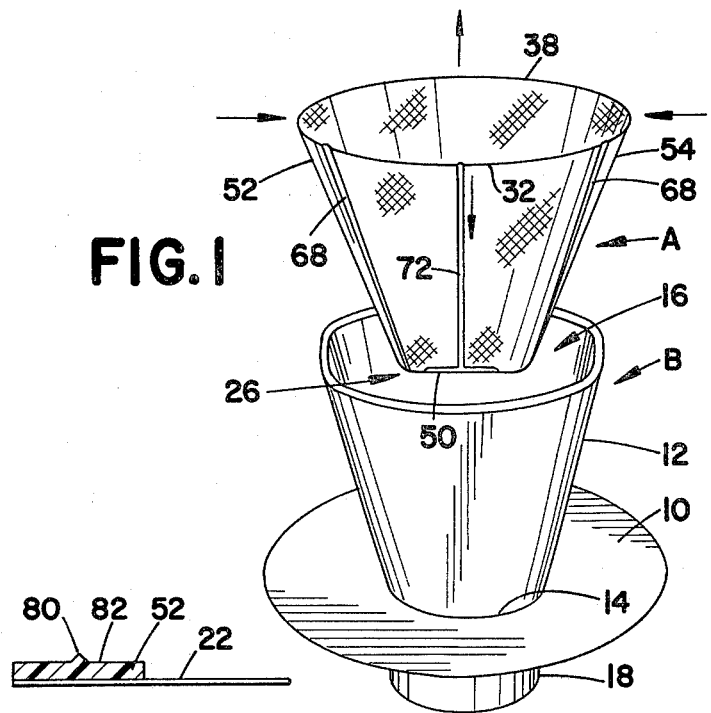
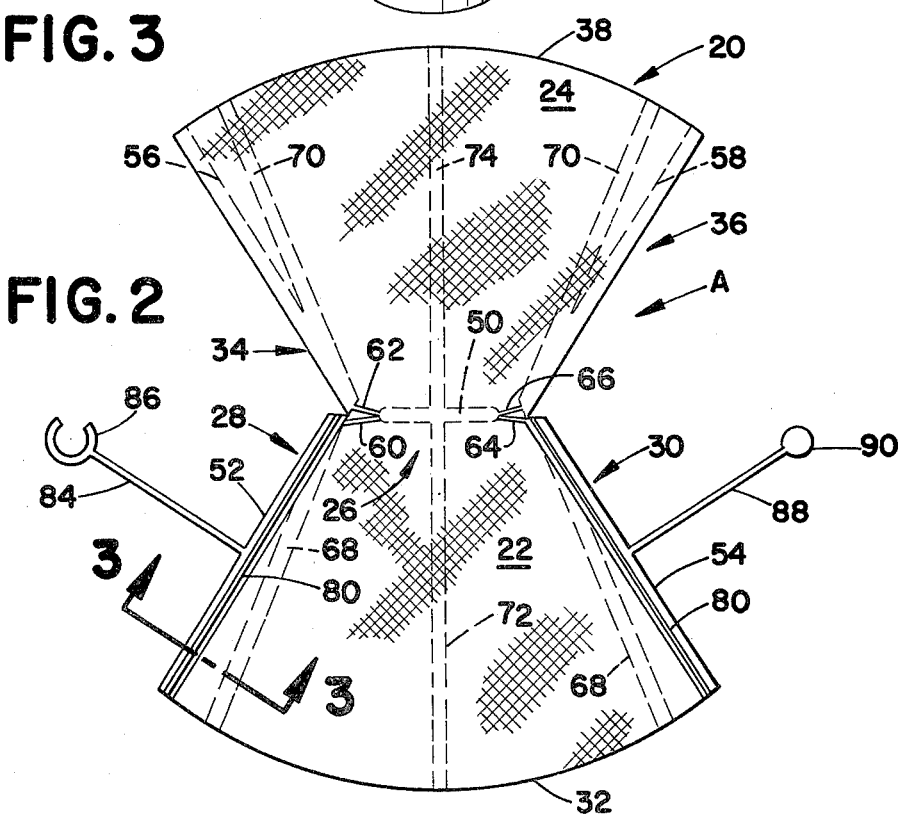

LIQUID FILTER

BACKGROUND OF THE INVENTION

This invention pertains to the art of filters and more particularly to liquid filters.

The invention is particularly applicable to a permanent, reuseable filter for coffee brewing apparatus and will be described with reference to such a construction which is adapted for use with one type coffee brewing apparatus where the filter has a somewhat oblong conformation. However, it will be appreciated by those skilled in the art that the concepts of the invention have broader applications and may be utilized in other environments and apparatus for filtering other liquids and liquid-like substances.

Drip type coffee makers have been used in commercial establishments for many years. In recent years, however, drip type coffee makers for home use have been introduced in the marketplace and have received wide customer recognition. Basically, drip type coffee makers utilize prepackaged or a measured amount of dry coffee granules placed in a filter basket or filter support which may be placed in communication with a source of hot water. A predetermined amount of hot water is introduced into the filter basket to intermix with the coffee granules and to be converted into coffee. This coffee then flows from the bottom area of the filter basket into a conventional serving container or carafe. There are many different types and styles of such coffee makers with one type of apparatus finding particular commercial success in the European market. Generally, in this type of apparatus, the so-called filter basket or holder rests directly on the serving container or carafe to receive hot water from a convenient source.

In conjunction with drip coffee makers, a filter is inserted into the filter basket which, in turn, receives the coffee granules. This filter acts to prevent the granules or grounds themselves from undesirably passing through the filter basket into the serving container or carafe. Heretofore, the vast majority of these filters have been constructed from a paper-like material. As such, they are only useable once and then discarded along with the coffee grounds when brewing has been completed. With regard to the type of brewing apparatus specifically noted above, the paper filters are packaged in quantity in a flattened condition and are constructed to be foldable into or assume a generally oblong, somewhat conical cup-shaped configuration generally compatible with the filter support.

Because of the necessity for using a new filter for each pot of coffee brewed and because of the attendant storage spaced required to maintain an adequate inventory or supply of such filters, it has been found desirable to develop a permanent type, reuseable filter construction particularly suited for use in such brewing apparatus. The present invention provides a new filter design and construction which meets these needs and which is easy to manufacture, inexpensive to manufacture, reuseable for an extended period of time and readily adapted to use in a number of different environments for filtering different liquids.

BRIEF DESCRIPTION OF THE INVENTION

In accordance with the present invention, there is provided a new liquid filter construction. This filter is comprised of a thin flexible filter body having opposed faces, an outer peripheral edge and a porosity adapted to filter a beverage passing therethrough to some desired extent. The filter body includes a generally centrally located elongated band-like area which defines a filter bottom. A support skeleton is affixed to at least one face of the filter body for giving form to and supporting the body when the filter is placed in a filtering condition within a filter support. The support skeleton includes at least a plurality of support ribs extending generally radially of the bank-like area or filter bottom toward the filter body outer peripheral edge. According to the preferred construction, the support skeleton is constructed from a plastic material having low moisture absorption characteristics and is mechanically bonded to the filter material. The filter material preferably comprises a cloth-like construction which also has low moisture absorption characteristics.

According to one more specific construction, the filter has a pair of opposed side wall areas and a pair of opposed end wall areas when disposed in the filter condition. The filter is selectively foldable from a generally flat storage condition to the filtering condition at least as the filter is inserted into an associated filter support. Also, at least some of the support ribs affixed to the filter body on one side of the band-like area are oppositely positioned from others of the support ribs affixed to the filter body on the other side thereof from the bank-like area. The first and second ones of some support ribs generally mate with the first and second ones of the other support ribs generally centrally of the opposed filter end wall areas when the filter is in the filtering condition.

In accordance with another construction for the filter, the filter body is defined by opposed first and second generally fan-shaped halves with the band-like area disposed at the interface between the halves. Each half includes side edges diverging outwardly of each other from adjacent the opposite ends of the band-like area toward the half outer peripheral edge. First and second support ribs are affixed to the filter body adjacent to and generally coextensive with the side edges of the first half and third and fourth support ribs are affixed to the filter body adjacent to and generally coextensive with the side edges of the second half. Each side edge of the first half is secured to an associated side edge of the second half to define elongated seam areas and thereby form a somewhat cup-shaped filter configuration.

In accordance with yet another aspect of the invention, the filter includes removable retaining means for temporarily maintaining the filter in an assembled condition while the side edges of the filter body first half are secured to the side edges of the filter body second half.

According to a still further aspect of the invention, one of the first and third support ribs is disposed on the inside surface of its associated filter body half with the other of the first and third support ribs disposed on the outside of its associated filter body half. Similarly, one of the second and fourth support ribs is disposed on the inside surface of its associated filter body half while the other of the second and fourth support ribs is disposed on the outside surface of its associated filter body half. The filter body halves are folded along the band-like area to bring the inner surfaces of the halves toward a facing relationship with each other. One of the first and third support ribs is folded over onto the other of the first and third support ribs and secured thereto so as to extend longitudinally coextensive therewith and define one seam area. In like manner, the one of the second and fourth support ribs is folded over onto the other of the second and fourth support ribs and secured thereto so as to extend longitudinally coextensive therewith and define another seam area.

The principal object of the present invention is the provision of a new and improved reuseable liquid filter construction.

Another object of the present invention is the provision of such a filter construction which is simple and inexpensive to manufacture.

A still further object of the present invention is the provision of a filter construction which is readily adapted to use in a number of different environments for different liquids.

Still other advantages and objects for the invention will become readily apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein:

FIG. 1 is a generally perspective view of one preferred filter construction as it is being inserted into a cooperative relationship with a filter basket or support;

FIG. 2 is a plan view showing the inside of the filter construction of FIG. 1 prior to the time it is assembled to assume a somewhat oblong cup-shaped configuration;

FIG. 3 is a cross-sectional view taken along lines 3—3 of FIG. 2;

DETAILED DESCRIPTION OF THE PREFERRED AND ALTERNATIVE EMBODIMENTS

Figure 4:
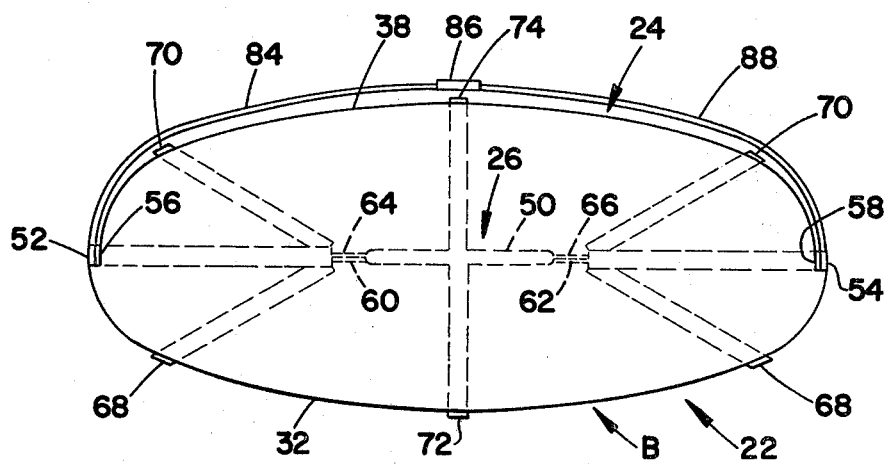
FIG. 4 is a plan view of the filter construction of FIG. 2 after the filter has been assembled to assume its somewhat cup-shaped configuration.

Referring now to the drawings wherein the showings are for purposes of illustrating preferred and alternative embodiments of the invention only and not for purposes of limiting same, FIG. 1 shows a beverage or coffee filter construction A as it is being inserted into a filter basket or holder B. As shown and as will be described hereinafter, the subject filter design is particularly adapted for use with one type of coffee brewing apparatus. Generally, and in such an arrangement, the filter basket or support B includes a disc-like base or bottom 10 having side walls 12 upstanding therefrom and diverging outwardly of a bottom end 14 toward open top end 16 so as to define an inverted, somewhat oblong bell-like configuration. A cylindrical mounting collar or extension 18 extends downwardly from the underside of disc or base 10 and has an outside diameter dimensioned to allow receipt thereof into the open top end of a coffee pot or carafe. The overall filter basket or support is thus supported by the pot or carafe itself during a coffee brewing process. Internal openings (not shown) communicate between bottom end 14 and mounting extension 18 through disc 10 to facilitate passage of coffee therethrough into the coffee pot.

With particular reference to FIG. 2, filter A includes a filter body generally designated 20 which is defined by a pair of opposed, generally fan-shaped halves 22, 24, interconnected to each other at a thin band-like area generally designated 26. When assembled or fabricated, this band-like area forms the filter bottom area as shown in FIG. 1. The material utilized for filter body 20 could be comprised of any number of different materials including plastics such as polypropylene and polyvinylchloride or could be constructed from a flexible metallic mesh.

However, and in the arrangement here under discussion, a monofilament cloth comprised of a square mesh screen fabric manufactured from synthetic monofilament yarns is preferred. Such materials are manufactured and marketed by Minneapolis Fabric Corp. of Minneapolis, Minnesota. Other than the desirability for being flexible, having some permanency and having low moisture absorption characteristics for at least the preferred application disclosed herein, the specifics of the material utilized for filter body 20 do not, in and of themselves, form a part of the invention and are not, therefore, described in greater detail herein.

The porosity, permeability or mesh opening sizes of filter material A are selected in a range which will allow the desired flow of coffee therethrough while preventing passage of the coffee grounds. The particular porosity or mesh size will, to some extent, depend upon the specific material utilized for filter body 20 and will also depend upon the intended filter use. Accordingly, it is not deemed necessary to discuss this feature in greater detail herein. The use of a filter material which is low in moisture absorption is desired when the filter is to be employed with coffee makers in order to prevent absorbing oils from the coffee granules or grounds during extended periods of use. Any such absorption might otherwise render the coffee bitter or rancid.

Continuing with reference to FIG. 2, filter body half 22 includes a pair of side edges 28, 30 diverging outwardly from band-like area 26 toward an arcuate outer peripheral edge 32. Similarly, filter body half 24 includes side edges 34, 36 diverging outwardly from band-like area 26 toward an arcuate outer peripheral edge 38. The angle of divergence or taper for side edges 28, 30 and 34, 36 is such that when fabricated, the resultant filter construction will be substantially compatible with the particular filter basket or holder B which is utilized. It should also be noted from the FIGURE that side edges 28, 30 are disposed outboard of side edges 34, 36 at corresponding areas therebetween. The reasons for this relationship will become more readily apparent hereinafter.

As shown in FIG. 2, the view of filter body 20 comprises the inside surface thereof which, upon use, will actually receive coffee granules. In order to provide some desired stability and support for the filter, a support skeleton comprised of a number of thin support ribs is advantageously provided. In the arrangement shown, these ribs are located so that upon fabrication, they will be located on the outside surface of filter body 20 so as to not interfere with the coffee granules or the like. For purposes of use in coffee makers, it is particularly desired that the support skeleton be non-absorbent and also be fairly rigid to give and maintain form to the filter construction. In addition, the material should be heat bondable to the material of filter body 20 since this is the preferred form of affixing the skeleton thereto. While some types of glues may be acceptable, their use is normally avoided in conjunction with beverages to eliminate any possibility of distortion in the beverage taste. In addition to heat bonding, other types of mechanical bonding arrangements may also be satisfactorily employed.

More particularly and with continued reference to FIG. 2, the support skeleton includes a base member 50 disposed along band-like area 26. First and second support ribs 52, 54 are fixedly secured to the inside surface of filter body half 22 as to extend substantially coextensive with side edges 28, 30, respectively. Similarly, third and fourth support ribs 56, 58 are fixedly secured to the outside surface of filter body half 24 so as to extend substantially coextensive with side edges 34, 36, respectively. Short base member extensions 60, 62 extend outwardly from one end of base member 50 and are interconnected with first and third support ribs 52, 56 adjacent the innermost ends thereof. In like fashion, short base member extensions 64, 66 extend outwardly from the other end of base member 50 and are interconnected with second and fourth support ribs 54, 58 adjacent the innermost ends thereof. Additional support ribs 68 are disposed on the outside surface of first filter body half 22 so as to form generally V-shaped configurations with first and second support ribs 52, 54. Likewise, additional support ribs 70 are affixed to the outside surface of filter half 24 so as to form generally V-shaped configurations with the third and fourth support ribs 56, 58. Center ribs 72, 74 extend outwardly along the outside surface of filter halves 22, 24, respectively, from base member 50 to outer peripheral edges 32, 38.

In the preferred construction, the above described support skeleton is constructed from polypropylene, although other plastics and materials could also be advantageously employed. The support skeleton may be integrally molded so as to include all the above described components as a single piece construction or may be fabricated from several pieces. The precise method of manufacture may, to some extent, be dictated by the specifics of the intended filter application.

With reference to FIG. 3, it should be noted that first support rib 52 includes an outwardly extending generally V-shaped protrusion or bead 80 along exposed outer face 82 thereof. This protrusion or bead extends over the entire length (FIG. 2) of the support rib and advantageously accommodates sonic welding of first rib to third rib 56 as will be described. Moreover, second support rib 54 includes a similar protrusion or bead over the length thereof.

Referring again to FIG. 2, first support rib 52 includes an elongated retaining arm 84 extending outwardly of the side wall thereof and includes a generally C-shaped lug receiver 86 at the outermost terminal end thereof. In like fashion, second support rib 54 includes an elongated retaining arm 88 extending outwardly thereof with a circular retaining lug 90 disposed at the outermost terminal end thereof. Receiver 86 is dimensioned to lockingly receive lug 90. As will be appreciated hereinafter, retaining arms 84, 88 are utilized to temporarily maintain the filter in an assembled condition to accommodate interconnecting the support ribs of filter body halves 22, 24. Once the filter has been assembled, these two arms are removed and discarded.

FIG. 4 somewhat schematically shows filter construction A of FIG. 2 in its assembled condition. The plan view of this Figure is looking into the interior of the filter from the open top end thereof. In assembling the filter, the two filter body halves 22, 24 are folded about band-like area 26 so that the inner surfaces of the halves are moved toward each other. First and second support ribs 52, 54 are folded over third and fourth support ribs 56, 58, respectively, in a longitudinal manner so that ribs 52, 56 and ribs 54, 58 extend longitudinally coextensive with each other. The location of support ribs 52, 54 slightly outward of support ribs 56, 58 (FIG. 2) allow this advantageous relationship to be obtained. As so folded, the originally exposed outer faces of first and second support ribs 52, 54 which include longitudinal protrusions or beads 80 thereon are placed into contact with the originally exposed outer faces of third and fourth support ribs 56, 58, respectively. The above described folding brings elongated retaining arms 84, 88 toward each other in a manner such that they may be interconnected by means of C-shaped lug receiver 86 and circular retaining lug 90. This then acts to temporarily maintain the filter construction in an assembled condition. Thereafter, support ribs 52, 56 and support ribs 54, 58 are fixedly connected to each other over their longitudinal extends. In the preferred arrangement, protrusions or beads 80 on support ribs 52, 54 readily accommodate sonic type welding so that the beads are substantially fused between the associated support ribs in the manner generally shown in FIG. 4. Of course, other connecting means may also be advantageously employed commensurate with the intended filter use.

The relationships between base member extensions 60, 62 and 64, 66 are such that when first support rib 52 is folded over third support rib 56 and second support rib 54 is folded over fourth support rib 58, the base member extension of each pair are brought together into close proximity with each so as to close band-like area 26 adjacent the opposed terminal ends of base member 50. Following assembly of the filter as described above, elongated retaining arms 84, 88 are removed from association with first and second support ribs 52, 54 and discarded. The interconnections between first and third support ribs 52, 56 and second and fourth support ribs 54, 58 form seam-like areas at generally opposed end areas of the overall filter construction.

When placed in use, filter A is simply inserted into the basket or holder B as shown in FIG. 1. Because of the assembly procedure described above, the filter may have a slightly longer length dimension between the opposed end areas thereof than does filter basket or holder B, at least at the open upper or top end thereof. In that event, and upon insertion of the filter into the filter basket, the end areas of the filter will be forced slightly inward with the side areas of the filter being simultaneously forced slightly outward as generally shown by the arrows in FIG. 1. The resilient nature of the various support ribs themselves will also tend to cause the filter to assume the desired conformation. Thus, the filter will closely assume the internal configuration of the filter basket at least at upon upper or top end 16 thereof. It should also be noted from FIG. 4 that all the various support ribs 52, 54, 56, 58, 68, 70, 72, and 74 are disposed on filter body halves 22, 24 so that upon filter assembly, they will be located on the outside surface of the filter body so as to prevent any interference or contact with coffee granules received in the filter interior for brewing purposes.

Figure 5:
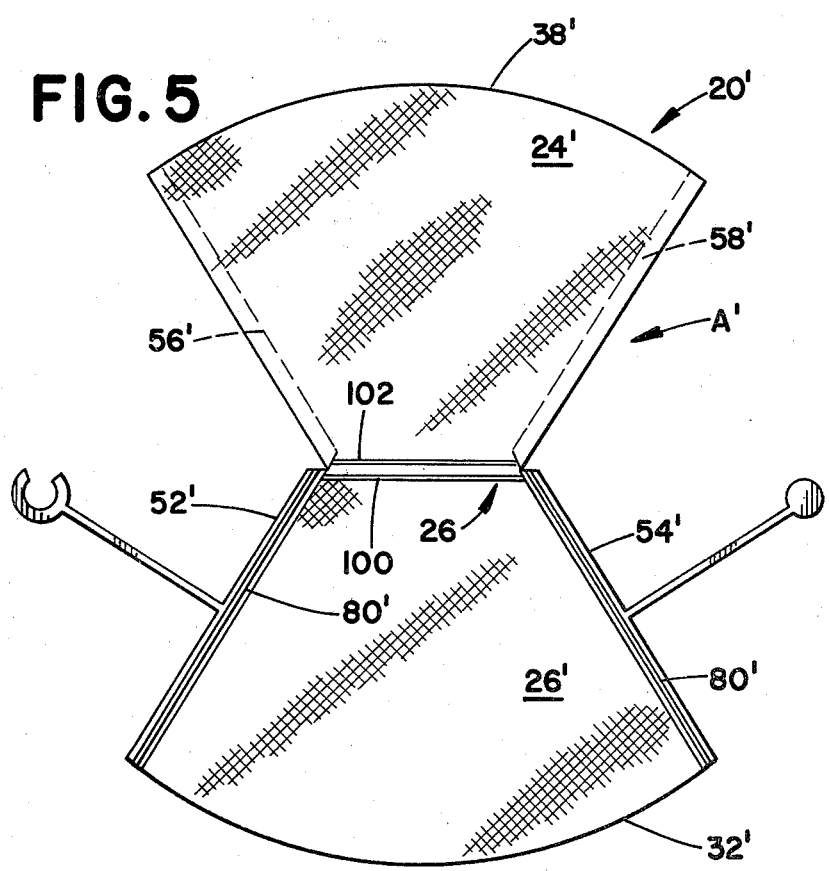
FIG. 5 is a view similar to FIG. 2 showing an alternative filter construction which incorporates the concepts of the subject invention.

FIG. 5 is similar to FIG. 2 and shows a slightly modified filter construction which incorporates the concepts of the subject invention thereinto. For ease of illustration, like components are identified by like numerals with a primed (') suffix and new components are identified by new numerals.

The FIG. 5 embodiment simply utilizes four support ribs, that is, first, second, third, and fourth support ribs 52', 54', 56' and 58', respectively. These support ribs are disposed along the side edges of filter body halves 22, 24 with support ribs 52', 54' again being positioned slightly outward of support ribs 56', 58'. In this embodiment, the base member extending along band-like area 26' is defined by a pair of base members 100, 102. As will be seen, these two base members are parallel to and slightly spaced apart from each other with base member 100 being affixed or connected to support ribs 52', 54' adjacent the inner ends thereof. Base member 102 is affixed or connected to support ribs 56', 58' in like fashion. The manner of assembly for this alternative filter construction is substantially similar to that herein above previously described.

Figure 6:
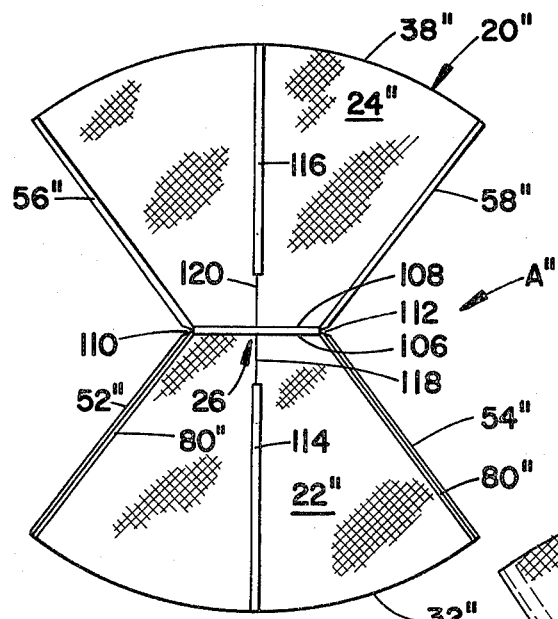
FIG. 6 is a view similar to FIG. 2 showing still another alternative filter construction which incorporates the concepts of the subject invention.

FIG. 6 shows another modification which incorporates the concepts of the subject invention thereinto. Here, like components are identified by like numerals with a double primed ('') suffix and new conponents are identified by new numerals. In this arrangement, a pair of parallel slightly spaced apart base members 106, 108 are included at band-like area 26''. Base member 106 is connected to support ribs 52'', 54'' adjacent the innermost ends thereof and base member 108 is similarly connected to support ribs 56'', 58''. In addition, support ribs 52'', 56'' are connected to each other at a joint or connection 110 and support ribs 54'', 58'' are connected to each other at a joint or connection 112. It will be noted from the Figure that support ribs 52'', 54'' mate with support ribs 56'', 58'', respectively. Also, these support ribs are all fixedly secured to the inside surface of body halves 22'', 24''.

As will be seen in FIG. 6, a center rib 114 is affixed to the inside surface of filter half 22'' and extends from band-like area 26'' to outer peripheral edge 32''. A center rib 116 is likewise affixed to the inside surface of filter body half 44'' to extend from band-like area 26'' to outer peripheral edge 38''. These two center ribs include areas 118, 120 of a smaller cross section adjacent the band-like area so as to minimize interference with the coffee granules during a coffee brewing process. Also, support ribs 52'', 54'' include outward protrusions or beads 80'' on the exposed faces thereof extending over their longitudinal extents.

For assembly purposes, filter body halves 22'', 24'' are merely folded toward each other about band-like area 26'' so that the originally exposed faces of first and third support ribs 52'', 56'' and second and fourth support ribs 54'', 58'' are brought into a contacting relationship with each other. Thereafter, these ribs may be affixed to each other as by sonic welding or the like in a manner previously described. Protrusions or beads 80'' advantageously facilitate ease of such connection. This type of filter construction will typically require some flexing upon insertion into the filter basket or holder as generally designated by the arrows in FIG. 1.

Figure 7:
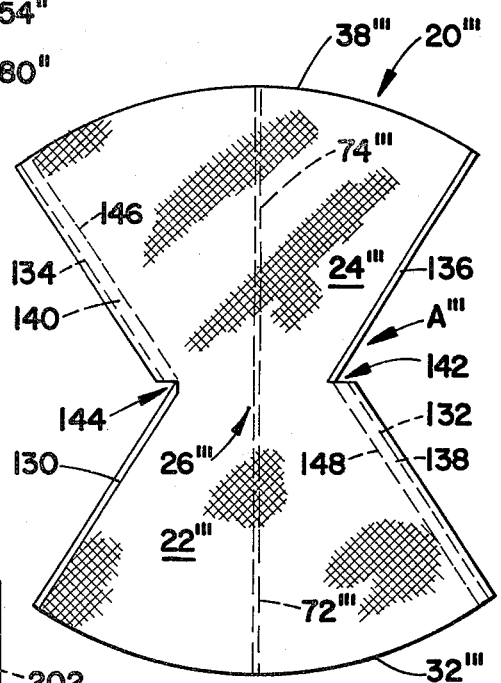
FIG. 7 is a view similar to FIG. 2 showing yet another alternative filter construction incorporating the concepts of the subject invention.

FIG. 7 shows still another alternative filter construction which incorporates the concepts of the subject invention. Here also for ease of illustration, like components are identified by like numerals with a triped primed suffix (''') and new components are identified by new numerals. More particularly, filter body half 22''' includes first and second support ribs 130, 132 disposed along the opposite diverging side edges thereof. The first support rib is disposed on the inside surface of the filter body half whereas the second support rib is disposed on the outside surface. In like fashion, third and fourth support ribs 134, 136 are associated with the diverging side edges of filter body half 24'''. The third support rib is disposed on the outside surface of the filter body half while the fourth support rib is disposed on the inside surface.

A stiffener rib 138 extends alongside and coextensive with second support rib 132 and a stiffener rib 140 is similarly positioned relative to third support rib 134. As will be noted from the Figure, second support rib 132 and its associated stiffener rib 138 are disposed outboard of fourth support rib 136. Similarly, third support rib 134 and its stiffener rib 140 are disposed outboard of first support rib 130. These relationships are accommodated by an extension area 142 on filter body half 22''' and an extension area 144 on filter body half 44'''. In this particular embodiment, no base member is included along band-like area 26''', although center ribs 72''', 74''' extend radially from the band-like area along filter body halves 22''', 24''', respectively.

In assembly of this particular filter construction, the filter body halves are again folded toward each other about band-like area 26'''. Filter body half 22'' is folded longitudinally along stiffener rib 138 in a manner so as to expose the outer face of the stiffener rib as well as second support rib 132 to fourth support rib 136. Stiffener rib 140 with third support rib 134 are similarly folded so that the outer faces thereof are exposed to first support rib 130. The first support rib may then be affixed to stiffener rib 140 at or adjacent inner edge 146 thereof by convenient means such as sonic welding, glues, or the like. In like fashion, fourth support rib 136 may be affixed to stiffener rib 138 at or adjacent inner side edge 148 thereof. With this construction, there will be a small internal seam, zone or band thus defined at each end area of the final filter construction.

Figure 8:
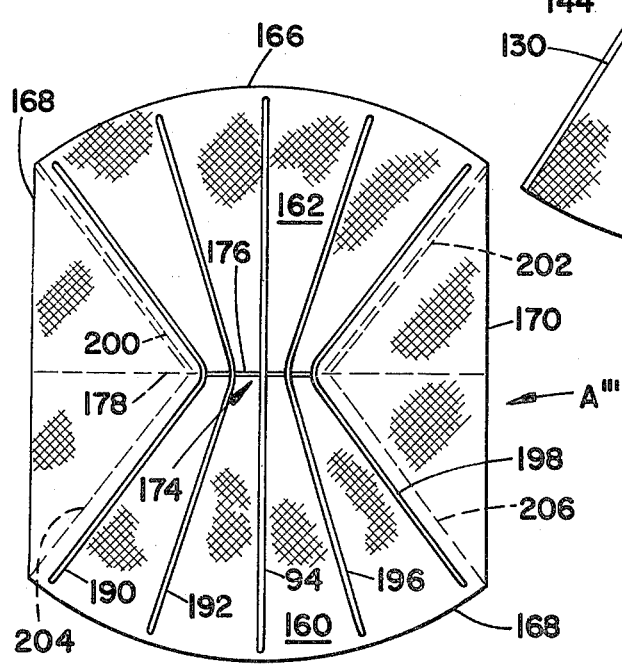
FIG. 8 is a plan view showing the outside of a foldable type filter construction which incorporates the concepts of the subject invention.

Finally, FIG. 8 shows another alternative embodiment which comprises a foldable type filter. This filter is normally stored in a flat condition and then folded to a generally oblong somewhat conical cup-shaped configuration when it is desired for use. In contrast to the views of FIGS. 2 and 5-7, FIG. 8 is a view of the outside surface of the filter construction.

More particularly, the filter itself is comprised of a pair of filter body halves 160, 162 which include arcuate outer peripheral edges 164, 166, respectively. The opposite ends of these outer peripheral edges are interconnected by filter body side edges 168, 170. A band-like bottom area 174 separates filter body halves 160, 162 over a portion thereof and includes a base rib 176. A central fold line 178 is coextensive with the base rib and extends outwardly from each of the opposed ends thereof so as to separate the filter body halves from each other.

Support rib pairs 190, 192, 194, 196 and 198 are disposed on and affixed to the outside surfaces of filter body halves 160, 162 so as to define generally fanlike arrays. An end area support rib 200 is affixed to the inside surface of second filter body half 162 outboard of and parallel to support rib 190. The outer end of rib 200 is disposed at the intersection of peripheral and side edges 166, 168 with the rib inner end disposed at fold line 178. Similarly, an end area support rib 202 is disposed on the inside surface of filter body half 162 outboard and parallel to support rib 198. Here, the outermost terminal end of support rib 202 is disposed at the intersection of peripheral and side edges 166, 170 with the rib inner end disposed at fold line 178. Fold lines 204, 206 are included on filter body halves 160, 162 in an opposite manner from support ribs 200, 202, respectively.

When placed into use, filter body halves 160, 162 are folded toward each other about fold line 178 and base rib 176 so that support rib pairs 190, 192, 194, 196, and 198 are located externally of the filter. Such folding acts to bring end support rib 200 toward fold line 204 and end support rib 202 toward fold line 206 so that the ribs and associated folds are generally coextensive with each other. As the filter construction is thereafter inserted into a filter basket or holder, the triangular areas defined at one filter body end by end support rib 200, fold line 204, and side edge 168 and at the other filter body end by end support rib 202, fold line 206 and side edge 170 may be moved to a flattened condition against the outside surface of one of filter body halves 160, 162 so as to not interfere with the filter interior. These triangular areas have, of course, each been previously folded in half along fold line 178.

Each support ribs 200, 202 define end areas of the filter and exert a small biasing force against corresponding end areas of an associated filter basket or holder. Such a biasing force will cause the sides of the filter to expand outwardly of each other against the filter basket side walls to present the filter in an opened, coffee receiving condition. This action is similar to that shown by the arrows in FIG. 1. Also, the resilient nature of support rib pairs 190, 192, 194, 196, and 198 from the original bending about base member 176 will act to urge the filter body halves apart from each other and into engagement with the side wall areas of the filter basket or holder.

For applications of the filter concepts disclosed herein above to other liquid filter applications, the number and orientation of the support ribs and the like may be appropriately varied. Also, the specific configuration of the support skeleton may be varied as necessary and/or appropriate to accommodate these other filtering applications. Such modifications are in no way deemed to depart from the overall intent or scope of the present invention.

The invention has been described with reference to the preferred and alternative embodiments. Obviously, modifications and alterations will occur to others upon the reading and understanding of this specification. It is intended to include all such modifications and alterations insofar as they come within the scope of the appended claims or the equivalents thereof.

Having thus described our invention, it is now claimed:

1. A permanent, reusable beverage filter adapted to assume a filter condition generally coextensive with at least a portion of the internal side wall of a somewhat cup-shaped filter support at least when said filter is inserted thereinto, said filter comprising:

a thin flexible filter body having opposed inner and outer faces, an outer peripheral edge and a porosity adapted to filter a beverage passing therethrough to some desired extent, said filter body further including a generally centrally located elongated band-like area which defines a filter bottom; and, a support skeleton non-integral with the material of said filter body and affixed to at least one face of said filter body for giving form to and supporting said body when said filter is in said filter condition, said support skeleton at least including a plurality of support ribs extending generally radially of said band-like area toward said filter body outer peripheral edge.

2. The filter as defined in claim 1 wherein said skeleton includes a base rib disposed on said filter body to extend along at least a portion of said band-like area.

3. The filter as defined in claim 1 wherein said skeleton support ribs are constructed from a plastic material having low moisture absorption characteristics and are mechanically bonded to said filter material.

4. The filter as defined in claim 1 wherein said filter material comprises a porous cloth constructed from a material having low moisture absorption characteristics.

5. The filter as defined in claim 1 wherein said filter has a pair of opposed side wall areas and a pair of opposed end wall areas when disposed in said filtering condition, said filter being selectively foldable from a generally flat storage condition to said filtering condition at least as said filter is inserted into an associated filter support.

6. The filter as defined in claim 5 wherein at least some of said support ribs affixed to said filter body on one side of said band-like area are oppositely positioned from other of said support ribs affixed to said filter body on the other side of said band-like area, first and second ones of said some support ribs generally mating with first and second ones of said other support ribs generally centrally of said opposed filter end wall areas when said filter is in said filtering condition.

7. The filter as defined in claim 6 wherein said filter body has a continuous generally curvilinear peripheral edge.

8. The filter as defined in claim 6 wherein said filter body includes opposed end edges extending transversely of said band-like area axially outward of the opposed ends thereof.

9. The filter as defined in claim 1 wherein said filter body comprises: opposed first and second generally fan-shaped filter body halves with said band-like area disposed at the interface between said halves, said halves each including side edges tapering outwardly of each other from adjacent the opposite ends of said band-like area toward the filter body peripheral edge; first and second support ribs affixed to said filter body adjacent and generally coextensive with the side edges of said first half and third and fourth support ribs affixed to said filter body adjacent and generally coextensive with the side edges of said second half, and means securing said first half to said second half at least adjacent the side edges thereof generally along a pair of elongated seam areas to thereby define a somewhat cup-shaped filter configuration.

10. The filter as defined in claim 9 wherein said securing means comprises means for affixing said first and third support ribs and said second and fourth support ribs to each other in a generally longitudinal coextensive relationship with each other.

11. The filter as defined in claim 10 wherein said affixing means comprises weld-like interconnections between said first and third support ribs and said second and fourth support ribs.

12. The filter as defined in claim 11 wherein one of said first and third support ribs and one of said second and forth support ribs include a longitudinally extending bead for engaging the other of said first and third support ribs and the other of said second and fourth support ribs at the area of interconnection therebetween.

13. The fiter as defined in claim 9 further including removable retaining means for at least temporarily maintaining said filter in said somewhat cup-shaped configuration while said filter body first half is secured to said filter body second half adjacent the side edges thereof.

14. The filter as defined in claim 13 wherein said retaining means includes a first retaining portion associated with one of said first and second support ribs, a second retaining portion associated with one of said third and fourth ribs, and means for selectively locking said first and second retaining portions together.

15. The filter as defined in claim 14 wherein said first retaining portion comprises a first retaining arm extending outwardly of said first support rib including first locking means adjacent the outermost terminal end thereof and a second retaining arm extending outwardly of said second support rib including second locking means adjacent the outermost terminal end thereof, said first and second retaining arms adapted to extend toward each other externally of said filter body and be locked together by first and second locking means.

16. The filter as defined in claim 9 wherein one of said first and third support ribs is disposed on the inner face of its associated filter body half with the other of said first and third support ribs disposed on the outer face of its associated filter body half with the other of said first and third support ribs disposed on the outer face of its associated filter half and wherein one of said second and fourth support ribs is disposed on the inner face of its associated filter body half with the other of said second and fourth support ribs disposed on the outer face of its associated filter half, said filter body halves being folded along said band-like area of bring the inner faces of said halves toward a facing relationship with each other, said one of said first and third support ribs being folded over onto the other of said first and third support ribs and secured thereto so as to extend longitudinally coextensive therewith and define one of said seam areas, said one of said second and fourth support ribs being folded over onto the other of said second and fourth support ribs and secured thereto so as to extend longitudinally coextensive therewith and define the other seam areas.

17. The filter as defined in claim 16 wherein the width of said filter body first half as measured between the side edges thereof is slightly greater than the width of said filter body second half as measured at corresponding areas between the side edges thereof so that said first half side edges are disposed outboard of the corresponding side edges of said second half, said first and second support ribs being secured to the inner face of said first half with said third and fourth support ribs being secured to the outer face of said second half and with each of said support ribs having an outer face surface, said first and second support ribs being folded over onto said third and fourth support ribs respectively so that the outer face surfaces are placed in contact with each other at least substantially over the coextensive lengths thereof and said securing means comprises means for affixing said first and third support ribs to each other and said second and fourth support ribs to each other so as to define said pair of elongated seam areas.

18. The filter as defined in claim 17 wherein one of said first and third support ribs and one of said second and fourth support ribs each include a longitudinally extending bead along the outer face surface thereof for engagement with the outer face surface of the other of said first and third support ribs and the other of said second and fourth support ribs, said affixing means cooperating between said beads and the outer face surface of the associated of said other support ribs.

19. The filter as defined in claim 18 wherein said affixing means comprises a weld-like connection.

20. The filter as defined in claim 9 furtherincluding at least one additional support rib affixed to each of said first and second filter body halves intermediate said first and second support ribs and said third and fourth support ribs respectively, said asdditional support ribs extending from at least adjacent said band-like area to at least adjacent the outer peripheral edge of the associated filter body half.

21. The filter as defined in claim 9 wherein said support skelton further includes a base rib extending along said filter body band-like area.

22. The filter as defined in claim 21 wherein the inner end areas of said first and second support ribs are at least fixedly associated with the opposite ends of said base rib and the inner end areas of said third and fourth support ribs are at least fixedly associated with the opposite ends of said base rib.

23. The filter as defined in claim 22 wherein said base rib is defined by a pair of slightly spaced apart generally parallel base rib members, said first and second support ribs being affixed to at least one of said base rib members and said third and fourth support ribs being affixed to at least the other of said base rib members.

24. The filter as defined in claim 22 wherein said base rib includes a pair of rib extensions diverging outwardly of each other from each of said base rib opposite ends with the inner end areas of said first, second, third, and fourth support ribs adjacent said band-like area being connected to separate ones of said rib extensions.

* * * * *